United States Patent [19]

Brolin

[11] 4,262,172

[45] Apr. 14, 1981

[54] RING-TRIP DETECTOR

[75] Inventor: Stephen J. Brolin, Livingston, N.J.

[73] Assignee: Bell Telephone Laboratories, Incorporated, Murray Hill, N.J.

[21] Appl. No.: 113,060

[22] Filed: Jan. 17, 1980

[51] Int. Cl.³ .............................................. H04M 3/02
[52] U.S. Cl. ............................ 179/18 HB; 179/17 E; 179/18 FA; 179/84 R
[58] Field of Search ........... 179/18 HB, 18 F, 18 FA, 179/84 R, 84 A, 17 E, 51 AA

[56] References Cited

U.S. PATENT DOCUMENTS

| | | | |
|---|---|---|---|
| 3,391,253 | 7/1968 | Grandmaison | 179/18 HB |
| 3,689,705 | 9/1972 | Pinede et al. | 179/17 E |
| 3,917,909 | 11/1975 | Macrander et al. | 179/18 HB |
| 3,941,939 | 3/1976 | Holmes et al. | 179/18 HB |

*Primary Examiner*—Thomas A. Robinson
*Attorney, Agent, or Firm*—Robert O. Nimtz

[57] ABSTRACT

A ring-trip detection circuit is disclosed which is suitable for use at the remote terminal of a pair gain system, i.e., a system designed to supply more than one telephone subscriber with loop service over a single pair of metallic wires. The ring-trip detector circuit comprises a simple filter and semiconductor threshold circuit which responds to subscriber loop currents to disable ringing signals when the subscriber goes off-hook. The detector circuits are powered entirely by the ringing signal itself and thus draw no power when in the inactive state and require no auxiliary powering source in the active state.

10 Claims, 1 Drawing Figure

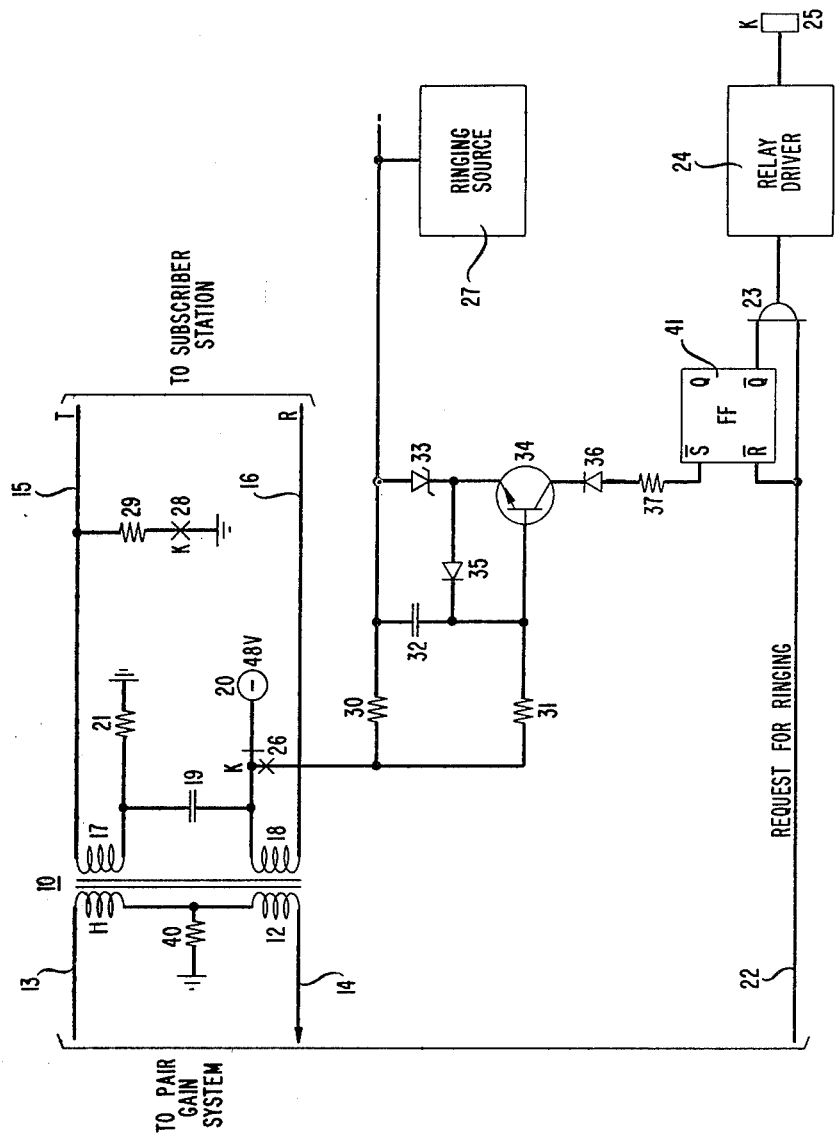

RING-TRIP DETECTOR

BACKGROUND OF THE INVENTION

1. Field of the Invention

This invention relates to signal detector circuits and, more particularly, to the detection of loop current in a telephone subscriber loop occurring in response to the removal of the handset in response to telephone ringing, i.e., ring-trip detection.

2. Description of the Prior Art

It has become common to supply telephone subscribers with telephone service over pair gain systems. A pair gain system is a signal multiplexing system which supplies more than one telephone subscriber channel over a single pair of twisted wires. Such pair gain systems are very useful in situations where the cost of providing metallic pairs for each subscriber is prohibitive. They are also useful in situations where it is desirable to defer the laying of new cable until sufficient demand develops or until unknown demand levels are ascertained. A final application of pair gain systems is to provide temporary service to a particular location such as, for example, the site of a political or athletic event.

In such pair gain systems, it is not possible to transmit ringing signals over the twisted pair since ringing signals must be provided for a plurality of different subscribers at the remote end of the pair gain system. In this situation, ringing signals are generated at the remote location and selectively applied to the particular subscribers by control signals sent over the pair gain system. It is desirable in such a situation that the ringing signals be provided by means of apparatus which is small in size and economical and consumes little power since such apparatus must be located in a remote location.

One of the ancilliary features required with such remote ringing supplies is the ability to trip the ringing signal, i.e., terminate the ringing signal, when the called subscriber goes off-hook. This off-hook condition can be detected from the current which flows through the subscriber telephone set when it is placed in the off-hook condition. Considerable difficulties are encountered, however, in detecting this relatively small direct current flow in the presence of extremely large alternating current ringing signals.

The problem, then, is to detect ring-trip currents in the presence of the ringing signal by means of circuitry which is small, inexpensive and rugged and thus suitable for use in the remote location on a per subscriber basis.

SUMMARY OF THE INVENTION

In accordance with the illustrative embodiment of the present invention, ring-trip currents are detected by means of a simple circuit involving a series resistor for developing a ring-trip voltage, a simple RC filter to remove alternating current signal components from the ring-trip voltage, a transistor switch and a voltage breakdown reference voltage device to detect the ring-trip threshold voltage. The output of such a detector can be used to disable or inhibit the application of the ringing voltage to the particular subscriber.

One particular advantage of the ring-trip circuit in accordance with the present invention is that the entire circuit is powered by the ringing signal itself. It is therefore unnecessary to provide a separate power supply to operate this detector. As is well-known, it is generally desirable to power such remote terminals over the telephone line itself alone or with commercial AC and battery backup. Any reduction in power requirements eases the problem of supplying such power remotely.

Furthermore, the extreme simplicity of this circuit allows it to be fabricated in a compact, inexpensive and reliable integrated circuit form, thus making it eminently suitable for remote applications which must be duplicated for each subscriber being served.

BRIEF DESCRIPTION OF THE DRAWING

The single drawing shows a detailed circuit diagram of a ring-trip detector circuit in accordance with the present invention.

DETAILED DESCRIPTION

Referring more particularly to the drawing, there is shown a detailed circuit diagram of a ring-trip detector circuit, in accordance with the present invention, comprising a hybrid transformer 10 having windings 11 and 12 to which an incoming line 13 and an outgoing line 14 are connected, respectively. Lines 13 and 14 are connected to a pair gain system not shown in the drawing. This pair gain system may be either analog or digital and may, for example, comprise the digital system disclosed in J. L. Caldwell U.S. Pat. No. 3,963,869, granted June 15, 1976, or it may comprise an analog pair gain system such as that shown in the copending application of B. S. Bosik, Ser. No. 974,384, filed Dec. 29, 1978.

In any event, the pair gain system delivers analog voice signals on lead 13 to hybrid transformer 10. These voice signals are delivered by way of hybrid action to tip conductor 15 and ring conductor 16 and thence to a subscriber station, also not illustrated. Voice signals from the subscriber station and arriving on conductors 15 and 16 are delivered to windings 17 and 18 of hybrid transformer 10 and, by way of hybrid action, delivered to outgoing line 14 for modulation and transmission on the pair gain system.

A capacitor 19 separates windings 17 and 18 of transformer 10 to block direct current and yet pass alternating current voice signals originating in the local subscriber loop comprising conductors 15 and 16. In normal operation, a talking battery voltage is supplied from −48 volt supply 20 through winding 18 to ring conductor 16. This voltage causes loop currents to flow through the telephone subscriber station connected between conductors 15 and 16. The return path for this loop current includes winding 17, resistor 21 and ground potential.

When a call is originated which is destined for one of the subscribers served by the pair gain system, a ringing control signal is generated at the central office end of the pair gain system to identify the particular subscriber to be rung. One such ringing signal control system is disclosed in the copending application of F. P. Tuhy, Jr., Ser. No. 974,389, filed Dec. 29, 1978. In response to such a signaling arrangement, a control signal is provided on lead 22 from the pair gain system to identify the particular subscriber connected to conductors 15 and 16 as the subscriber to be rung. The signal on lead 22 is applied to gate 23 which, when enabled, causes a relay driver circuit 24 to operate K relay 25. When operated, K relay 25 closes K contacts 26 to transfer the ring conductor 16 from the negative talking battery supply 20 to a ringing signal source 27. Ringing signal source 27 may comprise a ringing generator such as that disclosed in the copending application of B. S. Bosik and F. P. Tuhy, Jr., Ser. No. 034,200, filed Apr. 27, 1979. K contacts 28 complete the ringing signal connection through resistor 29 from tip conductor 15 to ground potential.

In accordance with the present invention, a resistor 30 is connected in series between the ringing source 27 and the ring conductor 16. Resistor 30 develops a voltage drop in response to ringing or loop currents on conductor 16. A low-pass filter comprising resistor 31 and capacitor 32 is connected across resistor 30. Thus, the alternating ringing currents which develop alternating voltages across resistor 30 are removed or greatly reduced by this low-pass filter.

When the subscriber connected to conductors 15 and 16 goes off-hook, a direct current path is established between conductors 15 and 16, through the telephone station set. In response to the ringing signal from source 27, a current will flow in the loop including resistor 30, winding 18, ring conductor 16, the telephone subscriber subset, tip conductor 15, resistor 29 and contacts 28. This direct current flow, while considerably smaller than the alternating current components caused by the ringing signal (one-third to one-fourth), causes a direct current voltage to build up on capacitor 32. When this voltage becomes of sufficient magnitude, the breakdown voltage of zener diode 33 is exceeded, thereby allowing current flow in the base-emitter path of transistor 34. Diode 35 protects the base-emitter path of transistor 34 from inverse voltages which might be damaging to the transistor junction.

The base-emitter current flow in transistor 34 causes an emitter-collector current to flow through diode 36 and resistor 37. This current is used to set flip-flop 41, removing the Q output and thus inhibiting input to gate 23. Diode 36 prevents reverse current flow and resistor 37 limits the magnitude of current flow. Gate 23 is therefore disabled in the presence of an output current through transistor 34, thereby disabling relay driver 24 and releasing K relay 25. When released, K relay 25 releases contacts 26 and 28, thereby removing the ringing signal from the subscriber loop comprising conductors 15 and 16. This removal of ringing signals when a subscriber goes off-hook is called "ring trip" and is necessary to terminate the ringing when the subscriber answers the telephone. Flip-flop 41 is reset by the reception of the next request for ringing on lead 22.

It can be seen that the ring-trip detection circuit described above is simple and reliable and is independent of the particular type of ringing source utilized. The ring-trip detector of the present invention also represents a small and compact circuit which is inexpensive to fabricate and ideally suited for replication in a large number of remote subscriber loops. Since the ring-trip detector of the present invention draws no current whatsoever in the disabled condition, it minimizes the amount of power which must be supplied either locally or over the pair gain transmission system from the central office. This reduction in power requirements further reduces the amount and size of circuitry which must be provided at the remote terminal of the pair gain system.

Switching ringing through hybrid winding 18 eliminates the need for contact protection networks. Capacitor 19 provides a path for ringing current to flow after contacts 26 are released. The leakage inductance of hybrid transformer 10 provides additional surge protection.

I claim:

1. A ring-trip detector circuit for the remote terminal of a pair gain subscriber loop transmission system
CHARACTERIZED BY
remotely located ringing signal generating means,
means responsive to direct loop current flow at said remote terminal for generating a voltage,
threshold means powered by said ringing signal generating means and responsive to said voltage generating means for generating an inhibit signal, and
means responsive to said inhibit signal for disabling said ringing signal generating means.

2. The ring-trip detector circuit according to claim 1 further
CHARACTERIZED IN THAT
said voltage generating means includes
resistance means connected in series with said ringing signal generating means, and
low-pass filter means connected across said resistance means.

3. The ring-trip detector circuit according to claim 1 further
CHARACTERIZED IN THAT
said threshold means includes
transistor means having its base-emitter path connected to the output of said voltage generating means, and
threshold breakdown voltage means connected in series in said base-emitter path.

4. The ring-trip detector circuit according to claim 3 further
CHARACTERIZED IN THAT
said threshold breakdown voltage means comprises a zener diode.

5. A ring-trip current detector comprising
a series resistance for developing a ring-trip voltage from said ring-trip current,
a low-pass filter connected to said series resistance,
a transistor having its base-emitter path connected to said filter, and
a zener diode connected in said base-emitter path.

6. The ring-trip current detector according to claim 5 further comprising
a diode and a resistor connected in series in the collector path of said transistor.

7. The ring-trip current detector according to claim 5 further comprising
a diode connected in parallel with and oppositely poled to the base-emitter junction of said transistor.

8. A ring-trip circuit comprising
a zener diode, the emitter-collector path of a transistor, a first diode and a resistor connected in series between a ringing signal source and a ringing signal disabling circuit,
a capacitor connected between said ringing signal source and the base of said transistor, and
a pair of resistors connected in series across said capacitor, the midpoint of said resistors supplying ringing signals to a telephone subscriber loop.

9. The ring-trip circuit according to claim 8 further comprising
a second diode connected between the base and emitter of said transistor.

10. The ring-trip circuit according to claim 8 further comprising
means responsive to said ringing signal disabling circuit for disconnecting said ringing signal source from said telephone subscriber loop.

* * * * *